United States Patent
Niwa (10) Patent No.: US 10,865,845 B2
(45) Date of Patent: Dec. 15, 2020

(54) VIBRATION CONTROL BUSH

(71) Applicant: Toyo Tire Corporation, Itami (JP)

(72) Inventor: Satoshi Niwa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/330,472

(22) PCT Filed: Oct. 10, 2017

(86) PCT No.: PCT/JP2017/036654
§ 371 (c)(1),
(2) Date: Mar. 5, 2019

(87) PCT Pub. No.: WO2018/079244
PCT Pub. Date: May 3, 2018

(65) Prior Publication Data
US 2019/0226543 A1   Jul. 25, 2019

(30) Foreign Application Priority Data

Oct. 31, 2016   (JP) .................................. 2016-212442

(51) Int. Cl.
| | | |
|---|---|---|
| *F16F 1/38* | (2006.01) | |
| *F16F 1/37* | (2006.01) | |
| *F16F 15/08* | (2006.01) | |
| *F16F 1/373* | (2006.01) | |
| *F16F 1/393* | (2006.01) | |
| *F16F 1/387* | (2006.01) | |

(52) U.S. Cl.
CPC .............. *F16F 1/38* (2013.01); *F16F 1/3732* (2013.01); *F16F 1/387* (2013.01); *F16F 1/393* (2013.01); *F16F 15/08* (2013.01); *B60G 2204/41* (2013.01)

(58) Field of Classification Search
CPC .. F16F 1/38; F16F 1/3732; F16F 1/387; F16F 1/393; F16F 15/08; B60G 2204/41
See application file for complete search history.

(56) References Cited

U.S. PATENT DOCUMENTS

| | | | | |
|---|---|---|---|---|
| 5,058,867 A | * | 10/1991 | Hadano ................... | B60G 7/005 248/635 |
| 5,887,859 A | * | 3/1999 | Hadano ..................... | F16F 1/38 267/141.1 |

(Continued)

FOREIGN PATENT DOCUMENTS

| | | |
|---|---|---|
| CN | 104968514 A | 10/2015 |
| JP | 63-110735 U | 7/1988 |

(Continued)

OTHER PUBLICATIONS

International Search Report dated Nov. 28, 2017, issued in counterpart application No. PCT/JP2017/036654, w/ English translation (5 pages).

(Continued)

*Primary Examiner* — Thomas J Williams
*Assistant Examiner* — James K Hsiao
(74) *Attorney, Agent, or Firm* — Westerman, Hattori, Daniels & Adrian, LLP (57) ABSTRACT

Provided is a vibration control bush configured to improve durability of a rubber elastic body. The vibration control bush includes: a shaft member that includes a spherical convex portion; a tubular member that is arranged on a radially outer side of the shaft member; and a rubber elastic body that joins the tubular member and the shaft member. The rubber elastic body is joined to a first portion and a second portion of the tubular member. The first portion is positioned on the radially outer side of the convex portion, and the diameter of the inner circumferential face gradually decreases axially outward from the center. The second portion is positioned on the axially outer side with respect to the first portion, and the diameter of the inner circumferential face gradually increases axially outward.

8 Claims, 3 Drawing Sheets

(56) References Cited

U.S. PATENT DOCUMENTS

| | | | |
|---|---|---|---|
| 9,475,358 B2* | 10/2016 | Grim | F16F 1/393 |
| 2002/0079629 A1* | 6/2002 | Tadano | F16F 1/3863 |
| | | | 267/140.11 |
| 2003/0020223 A1* | 1/2003 | Kameda | B21K 21/12 |
| | | | 267/293 |
| 2009/0289399 A1* | 11/2009 | Suzuki | F16F 1/393 |
| | | | 267/140.12 |
| 2015/0014906 A1* | 1/2015 | Shinobu | F16F 15/08 |
| | | | 267/141.2 |
| 2015/0247543 A1* | 9/2015 | Kuki | F16F 1/3842 |
| | | | 267/141.2 |
| 2015/0273967 A1 | 10/2015 | Grim | |

FOREIGN PATENT DOCUMENTS

| | | |
|---|---|---|
| JP | 9-100859 A | 4/1997 |
| JP | 2007-331496 A | 12/2007 |
| JP | 2008-1166 A | 1/2008 |
| JP | 2013-224728 A | 10/2013 |
| JP | 2015-535914 A | 12/2015 |
| WO | 2014/055084 A2 | 4/2014 |

OTHER PUBLICATIONS

Written Opinion dated Nov. 28, 2017, issued in counterpart application No. PCT/JP2017/036654 (3 pages).

International Preliminary Report on Patentability (Form PCT/IB/326) issued in counterpart International Application No. PCT/JP2017/036654 dated May 9, 2019, with Form PCT/IB/373 and PCT/ISA/237, with English translation (10 pages).

Office Action dated Mar. 20, 2020, issued in counterpart CN Application No. 201780052499.2, with English Translation. (12 pages).

Office Action dated May 19, 2020, issued in counterprat JP Application No. 2016-212442, with English translation (14 pages).

Office Action dated Sep. 4, 2020, issued in counterpart CN Application No. 201780052499.2, with English translation (11 pages).

* cited by examiner

VIBRATION CONTROL BUSH

TECHNICAL FIELD

The present invention relates to a vibration control bush, and especially relates to a vibration control bush configured to improve durability.

BACKGROUND ART

A vibration control bush is used at a part connecting a vehicle body and an arm, for example, a suspension mechanism of an automobile. A vibration control bush includes, for example, a shaft member that has a spherical convex portion projecting radially outward at the center in an axial direction, a tubular member that is arranged on a radially outer side of the shaft member and has a curved surface concaved corresponding to the convex portion at the center in the axial direction, and a rubber elastic body that joins an inner peripheral surface of the tubular member and an outer peripheral surface of the shaft member, in some cases (Patent Literature 1).

CITATION LIST

Patent Literature

Patent Literature 1: Japanese Unexamined Patent Application
Publication No. 2008-1166

SUMMARY OF INVENTION

Technical Problem

However, with the above-described conventional technique, when a load in a wrenching direction in which the shaft member and the tubular member are mutually inclined and a load in an axis-perpendicular direction increase, the rubber elastic body is compressed to bulge an axial end portion, and wrinkles are generated at the end portion, thus possibly reducing durability. Therefore, it is required to reduce the bulge and the generation of the wrinkles so as to improve the durability.

The present invention has been made to meet the above-described requirement, and it is an object of the present invention to provide a vibration control bush configured to improve durability of a rubber elastic body.

Solution to Problem

To achieve object, a vibration control bush of a first aspect includes a shaft member, a tubular member and a rubber elastic body. The shaft member includes a shaft portion and a spherical convex portion projecting radially outward from a center of the shaft portion in an axial direction. The tubular member is arranged on a radially outer side of the shaft member. The rubber elastic body joins an inner peripheral surface of the tubular member and an outer peripheral surface of the shaft member. The rubber elastic body has an end surface in the axial direction on which a recessed portion is formed. The recessed portion is recessed axially inward. The tubular member includes a pair of first portions and a pair of second portions. The pair of first portions is positioned on radially outer sides of the convex portion. The pair of first portions has an inner peripheral surface whose diameter gradually decreases axially outward from a center. The pair of second portions is positioned on axially outer sides with respect to the first portions. The pair of second portions has an inner peripheral surface whose diameter gradually increases axially outward. The rubber elastic body is joined to the first portions and the second portions.

Advantageous Effects of Invention

According to the vibration control bush of the first aspect, the rubber elastic body that joins the inner peripheral surface of the tubular member and the outer peripheral surface of the Shaft member has the end surface in the axial direction on Which the recessed portion recessed axially inward is formed. The tubular member includes the pair of first portions and the pair of second portions, and the first portions are positioned on the radially outer sides of the convex portion and have the inner peripheral surface whose diameter gradually decreases axially outward from the center. Accordingly, a spring constant in a wrenching direction can be decreased. The second portions are positioned on the axially outer sides with respect to the first portions, and have the inner peripheral surface whose diameter gradually increases axially outward, so as to allow the recessed portion to increase in radial length without load (length along a surface of the rubber elastic body). Accordingly, bulge and generation of wrinkles at an axial end portion of the rubber elastic body can be reduced when the load is applied. Consequently, durability of the rubber elastic body can be improved.

According to the vibration control bush of a second aspect, the recessed portion has a bottom portion in the axial direction on a radially inner side of the second portion, so as to ensure spring characteristics in an axis-perpendicular direction at the first portion while causing the second portion to be less likely to influence the spring characteristics in the wrenching direction. Accordingly, in addition to the effect of the first aspect, high spring characteristics in the axis-perpendicular direction and low spring characteristics in the wrenching direction are ensured.

According to the vibration control bush of a third aspect, the second portion is disposed on a radially outer side of at least a part of the shaft portion. Accordingly, an area of the inner peripheral surface of the first portion positioned on the radially outer side of the convex portion is ensured, so as to ensure the high spring characteristics in the axis-perpendicular direction in addition to the effect of the first aspect.

According to the vibration control bush of a fourth aspect, on a cross-sectional surface including an axis line of the shall portion, an angle between the inner peripheral surface of the second portion and the axis line is 45 or less. Consequently, the bulge and the generation of the wrinkles on the axial end portion of the rubber elastic body due to a compressive load can be reduced, and a tensile load acting on the axial end portion of the rubber elastic body can be reduced. Accordingly, in addition to the effect of the first aspect, the durability of the rubber elastic body can be improved.

DESCRIPTION OF EMBODIMENTS

Figure 1:
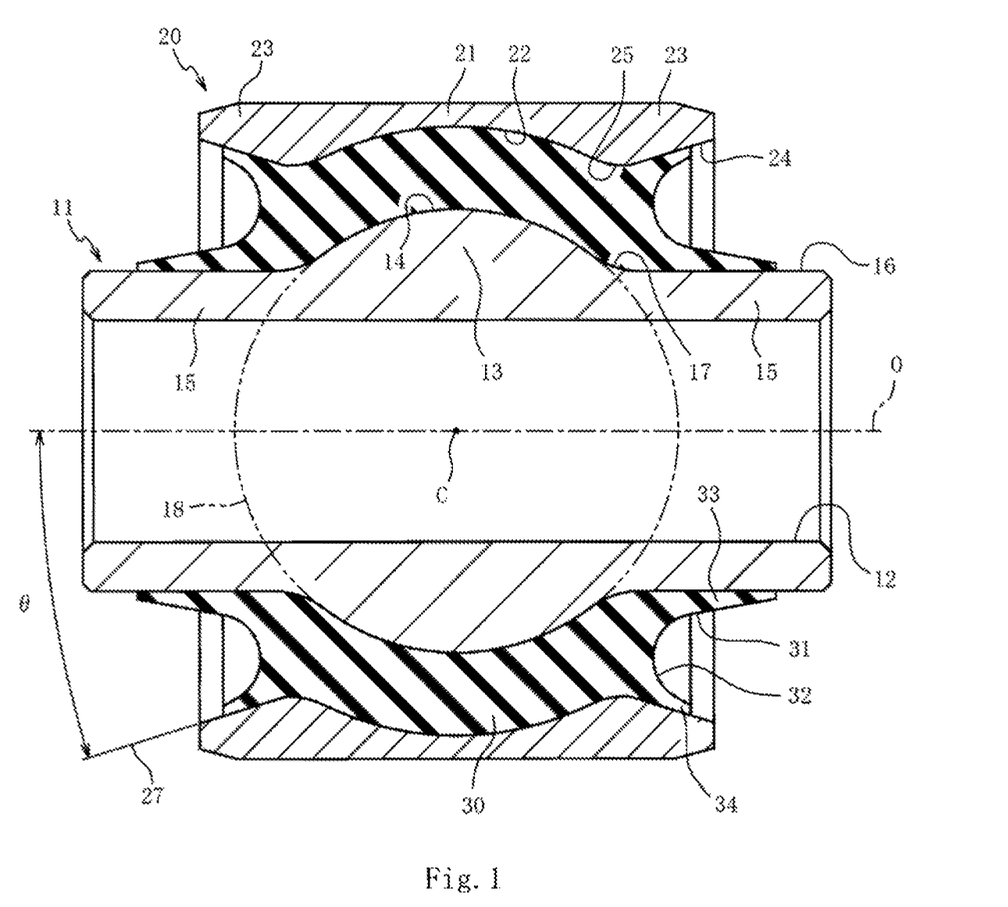
FIG. 1 is a cross-sectional view of a vibration control bush including an axis line in a first embodiment of the present invention.
Figure 2:
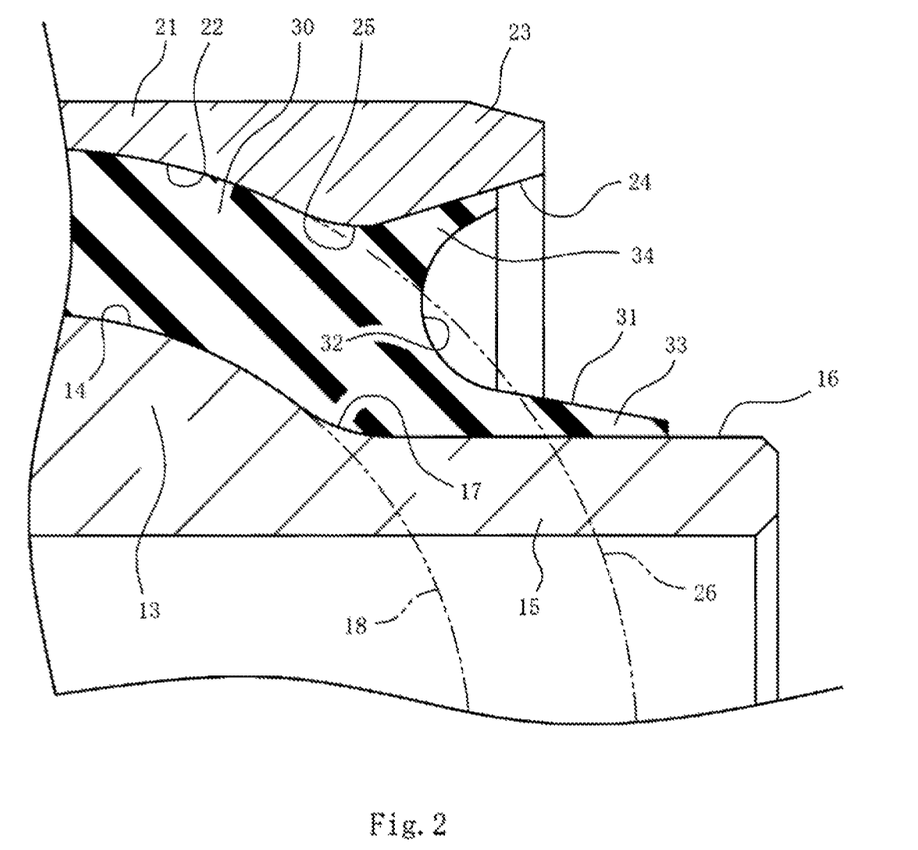
FIG. 2 is a partially enlarged cross-sectional view of the vibration control bush.

The following describes preferred embodiments of the present invention with reference to the attached drawings. FIG. 1 is a cross-sectional view of a vibration control bush 10 including an axis line O in a first embodiment of the present invention. FIG. 2 is a partially enlarged cross-sectional view of the vibration control bush 10.

As illustrated in FIG. 1, the vibration control bush 10 includes a shaft member 11, a tubular member 20 arranged on a radially outer side of the shaft member 11 separated from the shaft member 11, and a rubber elastic body 30 that joins the shaft member 11 and the tubular member 20. The vibration control bush 10 elastically joins an arm (not illustrated) used, for example, in a suspension mechanism of an automobile and a bracket (not illustrated) mounted to a vehicle body.

The shaft member 11 is a metallic member that includes a hole portion 12 passing through the shaft member 11 along the axis line O. A bolt (not illustrated) for fixing the shaft member 11 to a bracket (not illustrated) is inserted through the hole portion 12. The shaft member 11 includes a shaft portion 15 extending along the axis line O and a convex portion 13 disposed at the center of the shaft portion 15 in an axial direction (direction of axis line O).

The convex portion 13 is a portion where an outer peripheral surface 14 is bulged radially outward with respect to an outer peripheral surface 16 of the shaft portion 15. The convex portion 13 is formed in a spherical shape continuously projecting over a whole circumference in a circumferential direction. On a cross-sectional surface including the axis line O, the outer peripheral surface 14 of the convex portion 13 is formed in an arc shape having a diameter gradually decreased axially outward from the center in the axial direction.

The shaft portion 15 is a cylindrical portion having a constant diameter and the axially extending outer peripheral surface 16. The convex portion 13 and the shaft portion 15 have a boundary 17 where the outer peripheral surfaces 14 and 16 are smoothly connected. The outer peripheral surface 14 of the convex portion 13 is a part of a virtual circle 18 having a center C on the axis line O on the cross-sectional surface including the axis line O.

The tubular member 20 is a cylindrically-shaped metallic member having a diameter larger than that of the shaft member 11. The tubular member 20 is pressed into an arm (not illustrated). The tubular member 20 is configured such that an axial length is smaller than an axial length of the shaft member 11. The tubular member 20 includes a first portion 21 disposed at the center in the axial direction and a pair of second portions 23 positioned on axially outer sides of the first portion 21.

The first portion 21 is a portion arranged on the radially outer side of the convex portion 13, and has an inner peripheral surface 22 continuously concaved radially outward over the whole circumference in the circumferential direction. On the cross-sectional surface including the axis line O, the inner peripheral surface 22 of the first portion 21 is formed in an arc shape having a diameter gradually decreased axially outward from the center in the axial direction. The second portion 23 is a portion arranged on the radially outer side of the shaft portion 15, and has an inner peripheral surface 24 whose diameter gradually increases axially outward.

In this embodiment, the inner peripheral surface 24 of the second portion 23 is linearly formed on the cross-sectional surface including the axis line O. The first portion 21 and the second portion 23 have a boundary 25 where the inner peripheral surfaces 22 and 24 are smoothly connected. The inner peripheral surface 22 of the first portion 21 is a part of a virtual circle 26 having a center C on the axis line O on the cross-sectional surface including the axis line O. The virtual circles 18 and 26 are concentric circles having the common center C.

The rubber elastic body 30 is vulcanization-bonded to the outer peripheral surfaces 14 and 16 of the convex portion 13 and the shaft portion 15 of the shaft member 11 and the inner peripheral surfaces 22 and 24 of the first portion 21 and the second portion 23 of the tubular member 20. The rubber elastic body 30 includes recessed portions 31 recessed axially inward on end surfaces in the axial direction. The recessed portion 31 is continuously formed over the whole circumference in a circumferential direction of the rubber elastic body 30.

The recessed portion 31 is formed in an arc shape where an axial length of the rubber elastic body 30 gradually increases radially inward and outward from the center in the radial direction on the cross-sectional surface including the axis line O. On the cross-sectional surface including the axis line O, the recessed portion 31 intersects with the virtual circle 26, and as illustrated in FIG. 2, a bottom portion 32 of the recessed portion 31 in the axial direction resides inside the virtual circle 26 (center C side). Accordingly, a spring constant in a wrenching direction in which the shaft member 11 and the tubular member 20 are mutually inclined can be decreased.

Forming the recessed portion 31 on the axial end surface of the rubber elastic body 30 provides a first rubber portion 33 on a radially inner side of the recessed portion 31 and a second rubber portion 34 on a radially outer side of the recessed portion 31. The first rubber portion 33 is vulcanization-bonded to the outer peripheral surface 16 of the shaft portion 15 of the shaft member 11. The second rubber portion 34 is vulcanization-bonded to the inner peripheral surface 24 of the second portion 23 of the tubular member 20.

The first rubber portion 33 and the second rubber portion 34 are configured to have thicknesses in the radial direction gradually decreased axially outward for reducing masses of the first rubber portion 33 and the second rubber portion 34. The first rubber portion 33 is configured to have an axial length larger than an axial length of the second rubber portion 34 for ensuring a bonding surface of the rubber elastic body 30 and the shaft member 11.

The recessed portion 31 has the bottom portion 32 positioned on the radially outer side of the shaft portion 15, and the bottom portion 32 resides on the radially inner side of the second portion 23. The second portion 23 has an axially inner end (boundary 25) that resides on a radially outer side of the shaft portion 15 (including the boundary 17 as an axially inner end of the shaft portion 15). On the cross-sectional surface including the axis line O, an angle θ between a virtual straight line 27 extended from the inner peripheral surface 24 of the second portion 23 and the axis line O is set to 45° or less.

As illustrated in FIG. 2, on the cross-sectional surface including the axis line O, the boundary 17 is an intersection point of a perpendicular line to the axis line O and the shaft member 11, the perpendicular line to the axis line O passing through an intersection point of a straight line extended from the outer peripheral surface 16 of the shaft portion 15 and the virtual circle 18. On the cross-sectional surface including the axis line O, the boundary 25 is an intersection point of a perpendicular line to the axis line O and the tubular member 20, the perpendicular line to the axis line O passing through an intersection point of the inner peripheral surface 24 of the second portion 23 and the virtual circle 26.

Next, a method for manufacturing the vibration control bush 10 will be described. First, a workpiece (not illustrated) of the tubular member 20 before processing and the shaft member 11 are each prepared. The workpiece is a cylindrically-shaped member having an inner diameter and an outer diameter entirely increased by one size compared with the tubular member 20 of the vibration control bush 10 as the final product. The inner peripheral surface of this workpiece is cut to form the inner peripheral surface 22 of the first portion 21, and at the same time, the inner peripheral surface 24 of the second portion 23 is formed through the cutting work on the workpiece. The second portion 23 can be formed concurrently with the cutting work of the first portion 21, thus ensuring reduction of increase in manufacturing cost of the tubular member 20 having the second portion 23.

Next, after performing preprocessing for the vulcanization-bonding, for example, chemical conversion coating formation, on the shaft member 11 and the workpiece as necessary, the shaft member 11 and the workpiece are set in a cavity of a molding die (not illustrated) for the rubber elastic body 30. After the molding die is closed and a predetermined rubber material is filled in the cavity, heating and the like of the vulcanization processing is performed for vulcanization-molding of the rubber elastic body 30, and the rubber elastic body 30 is vulcanization-bonded to the shaft member 11 and the workpiece. Thus, a vulcanization-molded object (not illustrated) where the rubber elastic body 30 is vulcanization-bonded to the shaft member 11 and the workpiece is obtained.

Next, dies of a mold (not illustrated) for drawing, which has a plurality of radially divided dies, are pressed onto an outer peripheral surface of the workpiece of the vulcanization-molded object, and the diameter of the workpiece is reduced so as to become the inner diameter and the outer diameter of the tubular member 20 of the vibration control bush 10 as the final product while substantially keeping cross-sectional shapes of the first portion 21 and the second portion 23. Thus, the vibration control bush 10 where a radial precompression is applied to the rubber elastic body 30 that joins the shaft member 11 and the tubular member 20 is obtained.

The vibration control bush 10 is secured to the vehicle body of the automobile with the shaft member 11 by, for example, fastening the bolt (not illustrated) inserted through the hole portion 12 of the shaft member 11 to the vehicle body. Meanwhile, the tubular member 20 is pressed into the arm (not illustrated) constituting the suspension mechanism of the automobile. The vibration control bush 10 elastically joins the vehicle body and the arm while having the axis line O in an approximately front-rear direction of the automobile and an axis-perpendicular direction perpendicular to the axis line O in an approximately right-left direction of the automobile.

The vibration control bush 10 is required to have high spring characteristics in the axis-perpendicular direction for ensuring running stability of the automobile and similar purpose, and required to have low spring characteristics in the wrenching direction for ensuring ride comfort of the automobile and similar purpose. When the load applied to the vibration control bush 10 in the axis-perpendicular direction or the wrenching direction increases, the rubber elastic body 30 is compressed to bulge at an axial end portion. Repeating this possibly generates wrinkles at the end portion. The wrinkles easily cause a crack on the rubber elastic body 30.

In contrast, in the vibration control bush 10, the second portion 23 having the diameter of the inner peripheral surface 24 gradually increasing axially outward is positioned on the axially outer side of the tubular member 20 with respect to the first portion 21. Since the rubber elastic body 30 is joined to the second portion 23, a radial length of the recessed portion 31 without load (length along the surface of the rubber elastic body 30) can be increased. As a result, compared with a vibration control bush without the second portion 23, compression strain can be decreased at the axial end portion of the rubber elastic body 30 when the load in the axis-perpendicular direction or the wrenching direction is applied. Since the bulge and the wrinkle generation on the rubber elastic body 30 can be reduced, the durability of the rubber elastic body 30 can be improved compared with the vibration control bush without the second portion 23.

Since the recessed portion 31 has the bottom portion 32 on the radially inner side of the second portion 23, the spring characteristics in the axis-perpendicular direction is ensured at the first portion 21 and the second portion 23 can be made less likely to influence the spring characteristics in the wrenching direction. Accordingly, the vibration control bush 10 ensures the high spring characteristics in the axis-perpendicular direction and the low spring characteristics in the wrenching direction.

In the vibration control bush 10, the axially inner end (boundary 25) of the second portion 23 resides on the radially outer side of the shaft portion 15 (including the boundary 17) positioned on the axially outer side of the convex portion 13. As a result, the area of the inner peripheral surface 22 of the first portion 21 positioned on the radially outer side of the convex portion 13 is ensured. Since the rubber elastic body 30 is joined to the inner peripheral surface 22 of the first portion 21 and the outer peripheral surface 14 of the convex portion 13, the high spring characteristics of the vibration control bush 10 in the axis-perpendicular direction is ensured even if the second portion 23 is formed.

The vibration control bush 10 is configured such that the angle $\theta$ between the inner peripheral surface 24 of the second portion 23 and the axis line O is 45° or less on the cross-sectional surface including the axis line O. As a result, the bulge and the wrinkle generation at the axial end portion of the rubber elastic body 30 due to the compressive load can be reduced. Tensile strain at the axial end portion of the rubber elastic body 30 can be reduced. Accordingly, the durability of the rubber elastic body 30 can be improved.

Here, there is a tendency that, as the angle $\theta$ between the inner peripheral surface 24 of the second portion 23 and the axis line O becomes larger than 45°, the tensile strain on the recessed portion 31 increases due to the input of the load in the wrenching direction or the axial direction, thus possibly influencing the durability of the rubber elastic body 30. Setting the angle $\theta$ to 45° or less can reduce this tendency.

Figure 3:
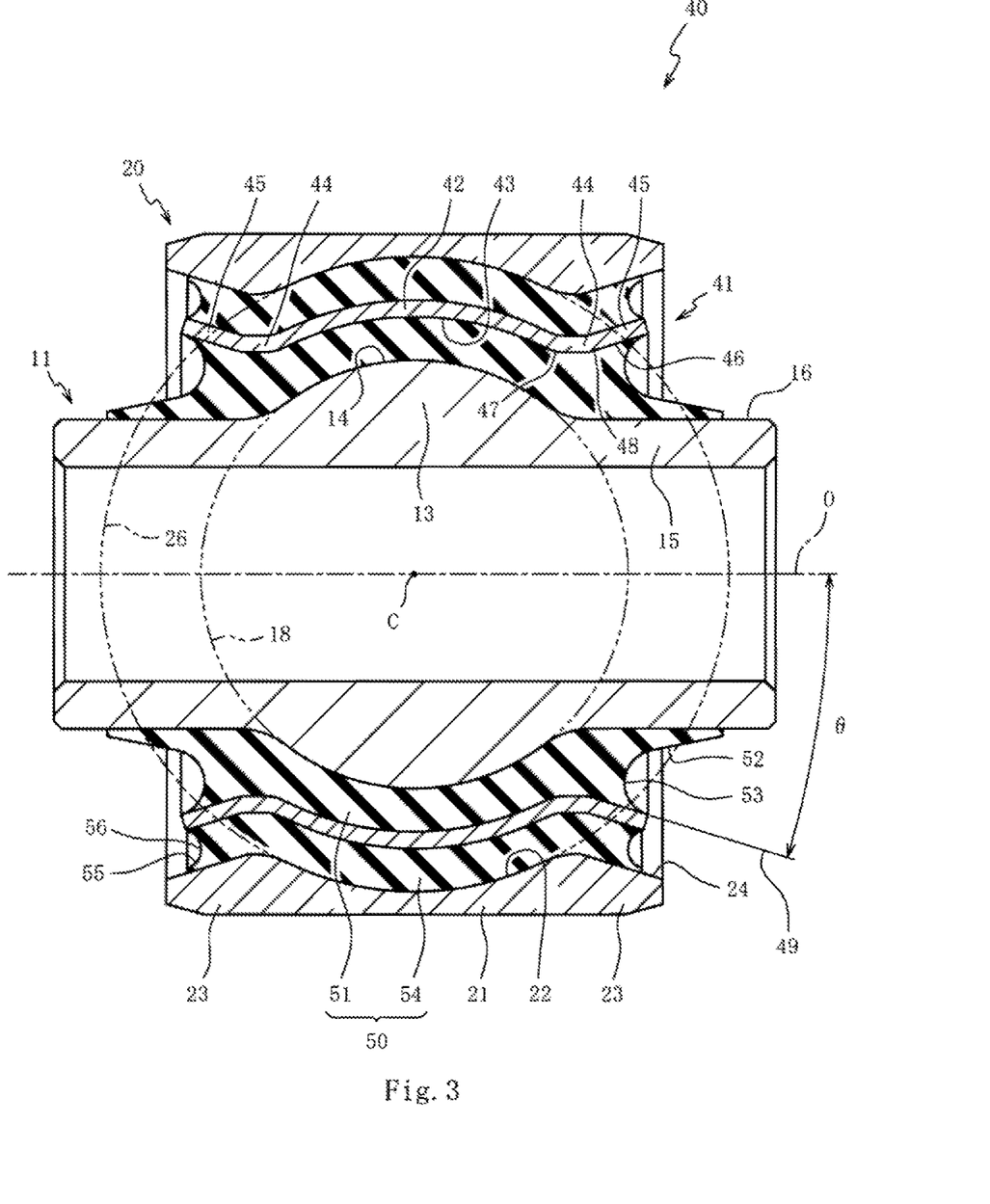
FIG. 3 is a cross-sectional view of a vibration control bush including an axis line in a second embodiment.

Next, a second embodiment will be described with reference to FIG. 3. In the second embodiment, a description will be given of a case where an intermediate cylinder 41 is arranged between the shaft member 11 and the tubular member 20. Like reference numerals designate elements identical to the elements described in the first embodiment, and therefore such elements will not be further elaborated here. FIG. 3 is a cross-sectional view of a vibration control bush 40 including the axis line O in the second embodiment.

As illustrated in FIG. 3, the vibration control bush 40 includes the intermediate cylinder 41 arranged on a radially inner side of the tubular member 20, and a rubber elastic body 50 that joins the shaft member 11 and the tubular member 20 in a state where the intermediate cylinder 41 is interposed. The intermediate cylinder 41 is a cylindrically-shaped metallic member having a diameter larger than that of the shaft member 11 and smaller than that of the tubular member 20. The intermediate cylinder 41 is a thin member compared with the shaft member 11 and the tubular member 20, and has an axial length configured to be smaller than axial lengths of the shaft member 11 and the tubular member 20. The intermediate cylinder 41 includes a first diameter-expanded portion 42 disposed at the center in the axial direction, and a pair of second diameter-expanded portions 45 positioned on axially outer sides of the first diameter-expanded portion 42 across a pair of intermediate portions 44.

The first diameter-expanded portion 42 is a portion arranged on the radially outer side of the convex portion 13, and has an inner peripheral surface 43 continuously concaved with respect to the intermediate portion 44 radially outward over the whole circumference in the circumferential direction. On the cross-sectional surface including the axis line O, the inner peripheral surface 43 of the first diameter-expanded portion 42 is formed in an arc shape having a diameter gradually decreased axially outward from the center. The intermediate portions 44 are cylindrical portions having an identical diameter.

A second diameter-expanded portion 45 is a portion arranged on a radially outer side of the shaft portion 15, and has a diameter of an inner peripheral surface 46 gradually increased axially outward with respect to the intermediate portion 44. The first diameter-expanded portion 42 and the second diameter-expanded portion 45 have boundaries 47 and 48 with the intermediate portion 44 where respective inner peripheral surfaces are smoothly connected.

The rubber elastic body 50 includes a rubber first elastic portion 51 that joins the shaft member 11 and the intermediate cylinder 41, and a rubber second elastic portion 54 that joins the intermediate cylinder 41 and the tubular member 20. The first elastic portion 51 is vulcanization-bonded to the convex portion 13 and the outer peripheral surfaces 14 and 16 of the shaft portion 15 of the shaft member 11, and the first diameter-expanded portion 42, the intermediate portions 44, and the second diameter-expanded portion 45 of the intermediate cylinder 41. The second elastic portion 54 is vulcanization-bonded to the first diameter-expanded portion 42, the intermediate portions 44, and the second diameter-expanded portion 45 of the intermediate cylinder 41, and the inner peripheral surfaces 22 and 24 of the first portion 21 and the second portion 23 of the tubular member 20.

The first elastic portion 51 includes recessed portions 52 recessed axially inward on end surfaces in the axial direction. The recessed portion 52 is continuously formed over the whole circumference in a circumferential direction of the first elastic portion 51. The recessed portion 52 is formed in an arc shape such that an axial length of the first elastic portion 51 gradually increases from the center radially inward and outward on the cross-sectional surface including the axis line O. On the cross-sectional surface including the axis line O, the recessed portion 52 intersects with the virtual circle 26, and a bottom portion 53 of the recessed portion 52 in the axial direction resides inside the virtual circle 26 (center C side). Accordingly, the spring constant in the wrenching direction in which the shaft member 11 and the tubular member 20 are mutually inclined can be decreased.

The second elastic portion 54 includes recessed portions 55 recessed axially inward on end surfaces in the axial direction. The recessed portion 55 is continuously formed over the whole circumference in a circumferential direction of the second elastic portion 54. The recessed portion 55 is formed in an arc shape such that an axial length of the second elastic portion 54 gradually increases from the center radially inward and outward on the cross-sectional surface including the axis line O.

The recessed portions 52 and 55 have the bottom portions 53 and 56 in the axial direction positioned on the radially outer side of the shaft portion 15 and the radially inner side of the second portion 23. The second diameter-expanded portion 45 has an axially inner end (boundary 48) that resides on a radially outer side of the shaft portion 15 (including the boundary 17 as an axially inner end of the shaft portion 15). On the cross-sectional surface including the axis line O, an angle θ between a virtual straight line 49 extended from the inner peripheral surface 46 of the second diameter-expanded portion 45 and the axis line O is set to 45° or less.

Since the vibration control bush 40 includes the intermediate cylinder 41, the spring constant in a torsion direction and the axial direction can be decreased compared with the vibration control bush 10 without the intermediate cylinder 41 in the first embodiment. Since the tubular member 20 includes the second portion 23, the compression strain at the axial end portion of the rubber elastic body 50 can be reduced as described in the first embodiment. The bulge and the wrinkle generation on the rubber elastic body 50 can be reduced, thus ensuring the durability of the rubber elastic body 50.

Embodiment

While the present invention will be described with embodiments, the present invention is not limited to these embodiments.

Embodiment

The vibration control bush 10 described in the first embodiment was used as the vibration control bush in Embodiment. This vibration control bush 10 had the angle θ of 17° between the inner peripheral surface 24 of the second portion 23 formed at the tubular member 20 and the axis line O. A load of 6.9 kN was applied to the shaft member 11 in the wrenching direction until the axis line O of the shaft member 11 inclined by 10.5° with respect to the axis line O of the tubular member 20 while the tubular member 20 of the vibration control bush 10 was secured. The compression strain at the portion between the shaft member 11 and the tubular member 20 on the rubber elastic body 30 was 46.8%.

Comparative Example

A vibration control bush for Comparative Example was prepared similarly to the vibration control bush in Embodiment except that the second portion 23 was not formed (the second portion 23 part was formed as a cylindrical pipe). A load of 6.9 kN was applied to the shaft member in the wrenching direction until the axis line of the shaft member inclined by 10.5° with respect to the axis line of the tubular member while the tubular member of the vibration control bush was secured. The compression strain at the portion between the shaft member and the tubular member on the rubber elastic body was 54.2%.

A load of 6.9 kN was applied to the shaft member in the wrenching direction until the axis line of the shaft member inclined by 9° with respect to the axis line of the tubular member while the tubular member of the vibration control bush in Comparative Example was secured. The compression strain at the portion between the shaft member and the tubular member on the rubber elastic body was 47.7%.

From this Embodiment, it has been found that disposing the second portion at the tubular member can decrease the compression strain on the rubber elastic body. Consequently, the bulge and the wrinkle generation on the compressed rubber elastic body can be reduced, thus ensuring the improvement of the durability of the rubber elastic body.

As described above, the present invention has been described based on the above-mentioned embodiments. It will be appreciated that the present invention will not be limited to the embodiments described above, but various modifications are possible without departing from the technical scope of the present invention. For example, sizes and shapes of the shaft member 11, the tubular member 20, and the intermediate cylinder 41, and the axial length of the second portion 23 can be set as necessary.

While the above-described embodiments have each described the case where the shaft member 11, the tubular member 20, and the intermediate cylinder 41 are made of metal, the configuration is not necessarily limited to this. Obviously, any or all of the shaft member 11, the tubular member 20, and the intermediate cylinder 41 can be made of synthetic resin. While the above-described embodiments have each described the shaft member 11 and the tubular member 20 as an integrated unit, the configuration is not necessarily limited to this. Obviously, the shaft member 11 and the tubular member 20 can be configured such that the shaft member 11 and the tubular member 20 are each divided into a plurality of members, and then, the plurality of members are butted.

While the above-described embodiments have each described the case where the first portion 21 is adjacent to the second portion 23 in the tubular member 20, the configuration is not necessarily limited to this. Obviously, a tubular intermediate portion can be interposed between the first portion 21 and the second portion 23 as the intermediate portion 44 of the intermediate cylinder 41 of the vibration control bush 40 in the second embodiment. Appropriately setting the axial length of the intermediate portion disposed between the first portion 21 and the second portion 23 ensures conveniently setting the axial length of the tubular member 20.

While the above-described embodiments have each described the case where the outer peripheral surface 14 of the convex portion 13 is formed in the arc shape as a part of the virtual circle 18 on the cross-sectional surface including the axis line O, the configuration is not necessarily limited to this. Obviously, a part of the outer peripheral surface 14 of the convex portion 13 can be formed flat on the cross-sectional surface including the axis line O. While the above-described embodiments have each described the case where the inner peripheral surface 22 of the first portion 21 is formed in the arc shape as a part of the virtual circle 26 on the cross-sectional surface including the axis line O, the configuration is not necessarily limited to this. Obviously, a part of the inner peripheral surface 22 of the first portion 21 can be formed flat on the cross-sectional surface including the axis line O. Also in these cases, since the tubular member 20 includes the second portion 23, the compression strain on the rubber elastic bodies 30 and 50 can be reduced.

While the above-described embodiments have each described the case where the inner peripheral surface 24 of the second portion 23 of the tubular member 20 is linearly formed on the cross-sectional surface including the axis line O, the configuration is not necessarily limited to this. Obviously, the inner peripheral surface 24 of the second portion 23 can be formed such that the inner peripheral surface 24 has a curved shape on the cross-sectional surface including the axis line O. When the inner peripheral surface 24 has the curved shape on the cross-sectional surface including the axis line O, the inner peripheral surface 24 can be formed to be either convex radially inward or convex radially outward.

When the inner peripheral surface 24 of the second portion 23 has the curved shape on the cross-sectional surface including the axis line O, an angle between a straight line and the axis line O is defined as the angle $\theta$ between the inner peripheral surface 24 of the second portion 23 and the axis line O, and the straight line passes through an axially outer most side of a part, where the second rubber portion 34 is in contact with the inner peripheral surface 24 of the second portion 23, and passes through the boundary 25 of the second portion 23.

While the above-described second embodiment has described the case where the intermediate cylinder 41 includes the second diameter-expanded portion 45, the second diameter-expanded portion 45 can be omitted. Even if the second diameter-expanded portion 45 of the intermediate cylinder 41 is omitted, the tubular member 20 includes the second portion 23, and the second portion 23 can reduce the compression strain at the axial end portion of the second elastic portion 54, thus ensuring the durability of the second elastic portion 54.

While the above-described second embodiment has described the case where the tubular member 20 includes the second portion 23, the second portion 23 can be omitted. Even if the second portion 23 of the tubular member 20 is omitted, the intermediate cylinder 41 includes the second diameter-expanded portion 45, and the second diameter-expanded portion 45 can reduce the compression strain at the axial end portion of the first elastic portion 51, thus ensuring the durability of the first elastic portion 51. When the second portion 23 of the tubular member 20 is omitted, the intermediate cylinder 41 corresponds to the tubular member according to the first aspect. Similarly, the first diameter-expanded portion 42 corresponds to the first portion according to the first aspect, and the second diameter-expanded portion 45 corresponds to the second portion according to the first aspect.

While the above-described second embodiment has described the case where the intermediate cylinder 41 includes the cylindrically-shaped intermediate portion 44, the configuration is not necessarily limited to this. The intermediate cylinder 41 can omit the intermediate portion 44.

While descriptions have been omitted in the above-described respective embodiments, a depressed portion depressed radially inward can be disposed on the outer peripheral surface 16 of the shaft portion 15 of the shaft member 11. The depressed portion disposed on the shaft member 11 ensures setting radial lengths of the recessed portions 31, 52, and 55 of the rubber elastic bodies 30 and 50 without load (lengths along the surfaces of the rubber elastic bodies 30 and 50) to be large in cooperation with the second portion 23 formed at the tubular member 20. Since the compression strain on the recessed portions 31, 52, and 55 can be reduced, the durabilities of the rubber elastic bodies 30 and 50 can be more improved.

While the above-described embodiments have each described the case where the vibration control bush 10 or 40 is built into the suspension mechanism of the automobile, the configuration is not necessarily limited to this. Obviously, the vibration control bush 10 or 40 can be built into the other mechanism. The other mechanism includes, for example, a torque rod of an engine mount.

The invention claimed is:

1. A vibration control bush, comprising:
   a shaft member that includes a shaft portion and a spherical convex portion projecting radially outward from a center of the shaft portion in an axial direction;
   a tubular member arranged on a radially outer side of the shaft member; and
   a rubber elastic body that joins an inner peripheral surface of the tubular member and an outer peripheral surface of the shaft member, the rubber elastic body having an end surface in the axial direction on which a recessed portion is formed, the recessed portion being recessed axially inward,
   wherein the tubular member includes:
      a first portion positioned on a radially outer side of the convex portion, the first portion having an inner peripheral surface whose diameter gradually decreases axially in each direction outward from a center; and
      a pair of second portions positioned on axially outer sides with respect to the first portion, each second portion of the pair of second portions having an inner peripheral surface whose diameter gradually increases axially outward from the center,
   wherein the rubber elastic body is joined to the first portion and each of the second portions, and
   wherein on a cross-sectional plane including an axis line of the shaft portion, for each of said second portions: an angle between a line defined by an inner peripheral surface the second portion and the axis line is 45° or less, wherein the line defined by the inner peripheral surface of the second portion is a) a line extending along a linear inner peripheral surface of the second portion or b) a line passing through i) an axially outer most position at which the rubber portion contacts the inner peripheral surface of the second portion and ii) an axially inner boundary of the second portion.

2. The vibration control bush according to claim 1,
   wherein the recessed portion has a bottom portion in the axial direction on a radially inner side of each of the second portions.

3. The vibration control bush according to claim 1,
   wherein each of the second portions is disposed on a radially outer side of at least a part of the shaft portion.

4. The vibration control bush according to claim 1, wherein the inner peripheral surface of the second portion is linear along a substantial portion of its length.

5. The vibration control bush according to claim 1, wherein the inner peripheral surface of the second portion has a curved shape.

6. The vibration control bush according to claim 1, wherein the angle between a line defined by an inner peripheral surface the second portion and the axis line is 45° or less, wherein the line defined by the inner peripheral surface of the second portion is a line passing through i) the axially outer most position at which the rubber elastic body contacts the inner peripheral surface of the second portion and ii) the axially inner boundary of the second portion.

7. The vibration control bush according to claim 4, wherein the angle between a line defined by an inner peripheral surface the second portion and the axis line is 45° or less, wherein the line defined by the inner peripheral surface of the second portion is a line passing through i) the axially outer most position at which the rubber elastic body contacts the inner peripheral surface of the second portion and ii) the axially inner boundary of the second portion.

8. The vibration control bush according to claim 5, wherein the angle between a line defined by an inner peripheral surface the second portion and the axis line is 45° or less, wherein the line defined by the inner peripheral surface of the second portion is a line passing through i) the axially outer most position at which the rubber elastic body contacts the inner peripheral surface of the second portion and ii) the axially inner boundary of the second portion.

\* \* \* \* \*